United States Patent [19]

Mizoguchi

[11] Patent Number: 5,241,320
[45] Date of Patent: Aug. 31, 1993

[54] CROSS-POLARIZATION INTERFERENCE CANCELLER

[75] Inventor: Shoichi Mizoguchi, Tokyo, Japan

[73] Assignee: NEC Corporation, Japan

[21] Appl. No.: 948,687

[22] Filed: Sep. 22, 1992

[30] Foreign Application Priority Data

Sep. 25, 1991 [JP] Japan ................... 3-273086

[51] Int. Cl.[5] ................. H01Q 21/06; H01Q 21/24
[52] U.S. Cl. ................... 342/362; 455/295; 455/296
[58] Field of Search ............... 342/362; 455/295, 296

[56] References Cited

U.S. PATENT DOCUMENTS

| | | | |
|---|---|---|---|
| 4,992,798 | 2/1991 | Nozue et al. | 342/362 |
| 5,023,620 | 6/1991 | Matsuura | 342/362 |
| 5,068,667 | 11/1991 | Mizoguchi | 342/362 |

OTHER PUBLICATIONS

Japanese Patent Application First Provisional Publication JP-A-300729/89.
"Digital Signal Processing", The Institute of Electronics, Information, Communication Engineers (IEICE), in Japan, 1978, Section 11.

*Primary Examiner*—Theodore M. Blum
*Attorney, Agent, or Firm*—Laff, Whitesel, Conte & Saret

[57] ABSTRACT

In a cross-polarization interference canceller employing a transversal filter, when a tap coefficient of the transversal filter is generated by averaging resultant values of correlation between a residual error component and a data polarity signal of a different polarized wave, a moving average derived by averaging with a sum of most recent given number of bits of correlation results, is employed. Even when offset is caused on the correlation results due to random characteristics of the received signal, the offset cannot be accumulated to allow derivation of the true tap coefficient since the sum of most recent given number of bits of correlation results is used.

6 Claims, 5 Drawing Sheets

CROSS-POLARIZATION INTERFERENCE CANCELLER

BACKGROUND OF THE INVENTION

The present invention relates generally to a cross-polarization cancellar. More specifically, the invention relates to a cross-polarization canceller which employs a transversal filter for a multi-level quadrature amplitude modulation system or multi-phase modulation system digital radio communication system.

In the recent digital communication systems, a cross-polarization transmission system has been employed, in which two orthogonally polarized waves, i.e., a horizontally polarized wave (H polarized wave) and a vertically polarized wave (V polarized wave), are used in order to transmit two independent signals at the same frequency so that an available frequency band can be effectively used. When cross-polarization transmission system is adapted to the multivalued quadrature amplitude modulation or the multi-phase modulation, a cross-polarization interference canceller is employed at a receiver side in order to remove a cross-polarization interference due to degradation of cross-polarization discrimination (XPD).

Figure 6:
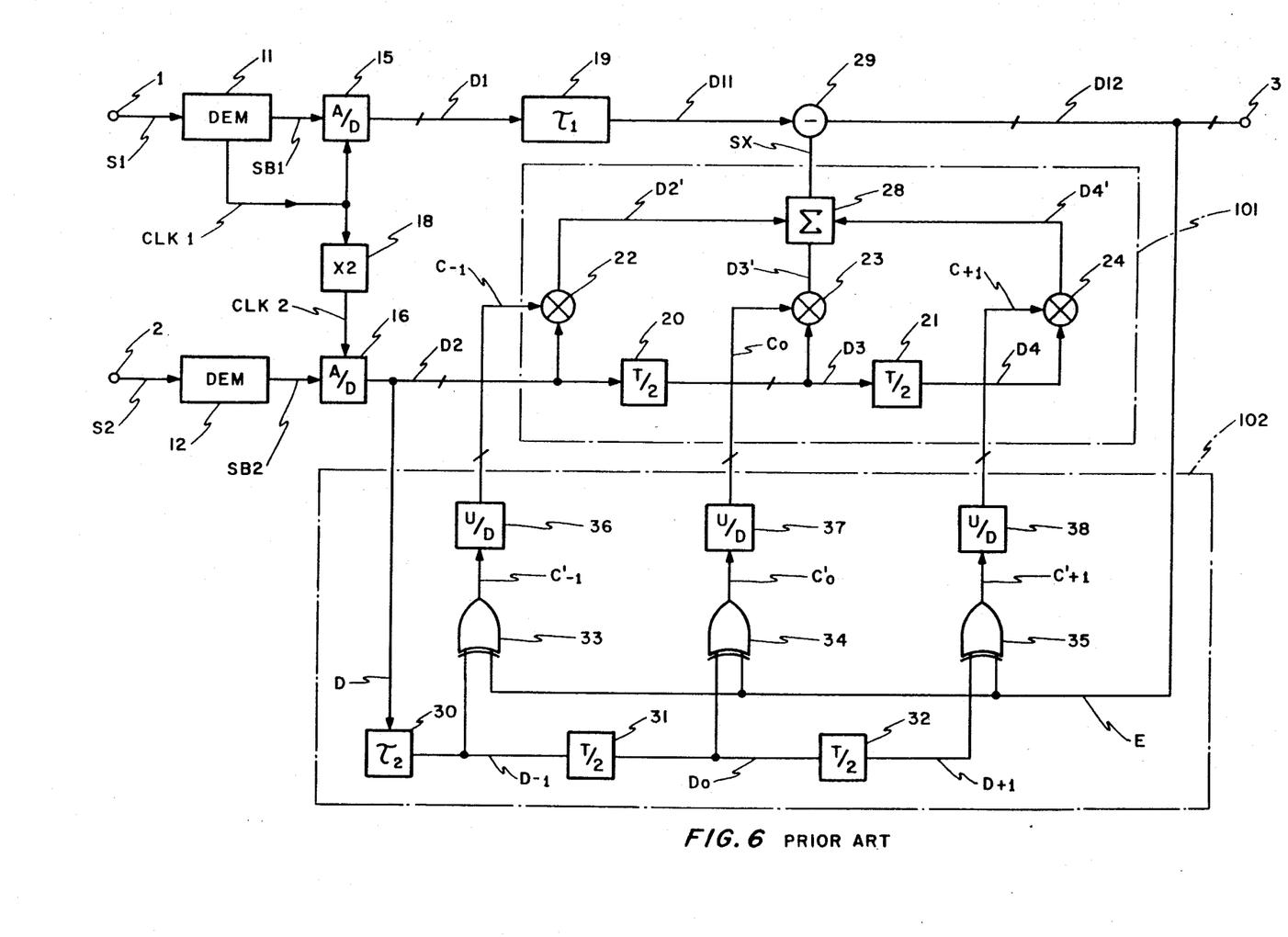
FIG. 6 is a block diagram of the above-mentioned conventional cross-polarization interference canceller.

FIG. 6 is a block diagram showing one example of the conventional cross-polarization interference canceller. The shown cross-polarization interference canceller employs a three tap fractional interval type transversal filter for canceling cross-polarization interference by digital signal processing in a base band. The fractional interval type transversal filter is used for the advantage that a compensation characteristics will not be degraded even when a fluctuation of a relative delay time difference is present between the horizontally polarized wave and the vertically polarized wave. For example, such kind of cross-polarization interference canceller has been disclosed in Japanese Patent Application First Provisional Publication JP-A-300729/89.

Brief discussion will be given with respect to the conventional cross-polarization interference canceller employing the fractional interval type transversal filter, with reference to FIG. 6. In the shown prior art, a T/2 interval type transversal filter, which has a tap of an interval of one half of a reproduction clock period T.

In FIG. 6, a modulation wave S1 of an intermediate frequency band of a primary polarized wave (for example, H polarized wave) side, which primary polarized wave is interfered, is input to a terminal 1. A modulation wave S2 of an intermediate frequency band of a different polarized wave (for example, V polarized wave) side, which different polarized wave provides the interference, is input. The primary polarized wave signal S1 and the different polarized wave signal S2 are respectively input to demodulators 11 and 12, respectively. The demodulators 11 and 12 are responsive to those input signals to output base band signals SB1 and SB2 to respective of analog-to-digital converters 15 and 16.

The demodulator 11 reproduces a clock signal CLK1. The clock signal CLK1 is input to the analog-to-digital converter 15. At the same time, the clock signal CLK1 is input to a doubler circuit 18. The doubler circuit 18 doubles the input clock signal CLK1 to output a doubled clock signal CLK2 to the analog-to-digital converter 16. The analog-to-digital converter 15 samples and quantizes the primary polarized wave side base band signal SB1 with the clock signal CLK2 to output a digital signal sequence D1 to a delay circuit 19.

Also, the analog-to-digital converter 16 samples and quantizes the different polarized wave side base band signal SB2 with the clock signal CLK2 to output a digital signal sequence D2 to a transversal filter 101.

The transversal filter 101 outputs a compensation signal SX derived by controlling amplitude and phase of the signal from the analog-to-digital converter 16. The compensation signal SX is input to a subtracter 29. The subtracter 29 also receives the output D11 of a delay circuit 19. The subtracter 29 subtracts the output signal of the transversal filter 101 from the output D11 of the delay circuit so as to remove an interference component superimposed on the primary polarized wave signal. The primary polarized wave signal D12, from which the interference component is removed, is output to a terminal 3.

On the other hand, among the primary polarized wave signal D12, an error signal E representative of an deviation of the received signal from a reference value, is supplied to a transversal filter control circuit 102. The transversal filter control circuit 102 correlates the most significant bit D (data polarity signal) of the output D2 of the analog-to-digital converter 16 and the error signal E, and controls a weighting coefficient of each tap of the transversal filter 101 so as to minimize the error signal component. The control algorithm employed is generally called as MZF (Modified Zero Forcing) method. The detail of the MZF method has been discussed in "Digital Signal Processing", The Institute of Electronics, Information, Communication Engineers (IEICE), in Japan, 1975, Section 11.

Next, operation of the transversal filter control circuit 102 will be discussed. The error signal E is indicative of an offset amount of a received multi-level base band signal from the reference value. In case of $2^N$ valued base band signal, when this signal is analog-to-digital converted, the (N+1)th bit from the most significant bit becomes the error signal E which represents the polarity of the error. Normally, as the error signal, the (N+1)th bit of the signal D12 after compensation of the interference is used to represent a polarity of a residual error component after compensation. On the other hand, as a data polarity signal D, the first bit of the input signal D2 of the transversal filter 101 is used in case of the MZF method. The data polarity signal D is inputted to a delay circuit 30 for compensation of delay in a multiplier 23 and an adder 28 in the transversal filter 101. After adjustment of the timing relative to the error signal E, the data polarity signal D is input to flip-flops 31 and 32 which are connected in series.

With regard to a tap coefficient C0 of the multiplier 23 in case of a center tap of the transversal filter, at first, the binary signal C0' is derived as a product of binary values of the error signal E and a signal D0 which is the T/2 sec. delayed output D-1 delayed by the delay circuit. Namely, the binary signal C0' is derived by an exclusive OR (EX-OR) circuit 34 to be input to an up/down counter 37. The up/down counter comprises a K stage shift register. The upper M bits of the K-stage shift register as the up/down counter 37 are input to the multiplier 23 as the tap coefficient C0. In the similar way, a tap coefficient C-1 for a -1 tap and a tap coefficient C+1 for a +1 tap are generated. These tap coefficients C-1 and C+1 are input to respective multipliers 22 and 24.

It should be noted that expressing the error signal E and the data polarity signal D at a timing t respectively as E(t) and D(t), the tap coefficient C0(L) of the center tap at a timing t=L can be expressed by the following equation:

$$C0(L) = \left(\frac{1}{2^K}\right) \sum_{t=1}^{L} E(t) \times D0(t) \quad (1)$$

where K represents number of stages of the up/down counter

To the multipliers 22, 23 and 24, the output signal D2 of the analog-to-digital converter 16, the signal D3 derived by delaying D2 for T/2 sec, and the signal D4 derived by delaying D3 for T/2 sec are input respectively. A product D2' of D2 and C−1, a product D3' of D3 and C0 and a product D4' of D4 and C+1 are added in an adder 28 and then output to the subtracter 29 as the compensation signal SX. With the foregoing construction, the cross-polarization interference component superimposed in the primary polarized wave side signal can be removed.

In such conventional cross-polarization interference canceller, a tap coefficient averaging circuit of the transversal filter control circuit derives an average by all correlation results E(t)·D1(t) from a time t=1 where canceller initiates operation to the instantaneous timing t=L, it requires substantially long period for averaging. Therefore, when no cross-polarization interference is present, at which the tap coefficient value should be zero, the tap coefficient can be offset from zero when slight offset is contained in the correlation result.

For example, assuming that the number of stages of the up/down counter is K=20, L=$10^6$, and the rate of the correlation result is "1":"−1"=51:49 (high level is "1" and low level is "−1"), the tap coefficient C0 of the center tap can be expressed by:

$$C0 = \left(\frac{1}{20^{20}}\right) \times \frac{2}{100} \times 10^6 = 0.019 \quad (2)$$

Therefore, correct tap coefficient cannot be obtained and rather cause extra interference.

SUMMARY OF THE INVENTION

Therefore, it is an object of the present invention to provide a cross-polarization interference canceller which can obtain the tap coefficient satisfactorily close to a true tap value and thus will not generate extra interference noise when a cross-polarization is substantially not present.

According to the present invention, there is provided a cross-polarization interference canceller comprises:
 a first demodulator for demodulating a primary polarized wave signal among two orthogonally polarized signals;
 a second demodulator for demodulating a different polarized wave signal;
 a first analog-to-digital converter for sampling and quantizing an output base band signal of the first demodulator with a reproduction clock;
 a second analog-to-digital converter for sampling and quantizing an output base band of the second demodulator with the reproduction clock;
 a T/M interval all digital type transversal filter operating at a clock period of 1/M (M is natural value) of a period T of the reproduction clock with respect to an output digital signal sequence of the second analog-to-digital converter;
 a transversal filter control means for supplying tap coefficient for the transversal filter;
 a delay means connected to the output of the first analog-to-digital converter for providing a delay corresponding to a time delay by the transversal filter;
 a digital subtracter outputting a compensated primary polarized wave signal by subtracting an output digital signal sequence from the transversal filter from an output signal sequence of the delay means for canceling cross-polarization interference from the different polarized wave side contained in the primary polarized wave signal;
 the transversal filter control means including a running averaging means for generating the tap coefficient with a moving average averaged always using a sum S of correlation outputs over a most recent predetermined J bits (with taking correlation output at t=1 is the first bit and current correlation output at a current time t=L is the Lth bit, J is a normal value less than or equal to L) among the correlation outputs for outputting the tap coefficient by averaging outputs of correlation between a residual error component contained in compensated primary polarized wave signal and a data polarity signal of the output digital signal sequence of the second analog-to-digital converter.

BRIEF DESCRIPTION OF THE DRAWINGS

The present invention will be understood more fully from the detailed description given herebelow and from the accompanying drawings of the preferred embodiments of the present invention, which, however, should not be taken to be limitative to the invention, but are for explanation and understanding only.

In the drawings.

DESCRIPTION OF THE PREFERRED EMBODIMENTS

Figure 1:
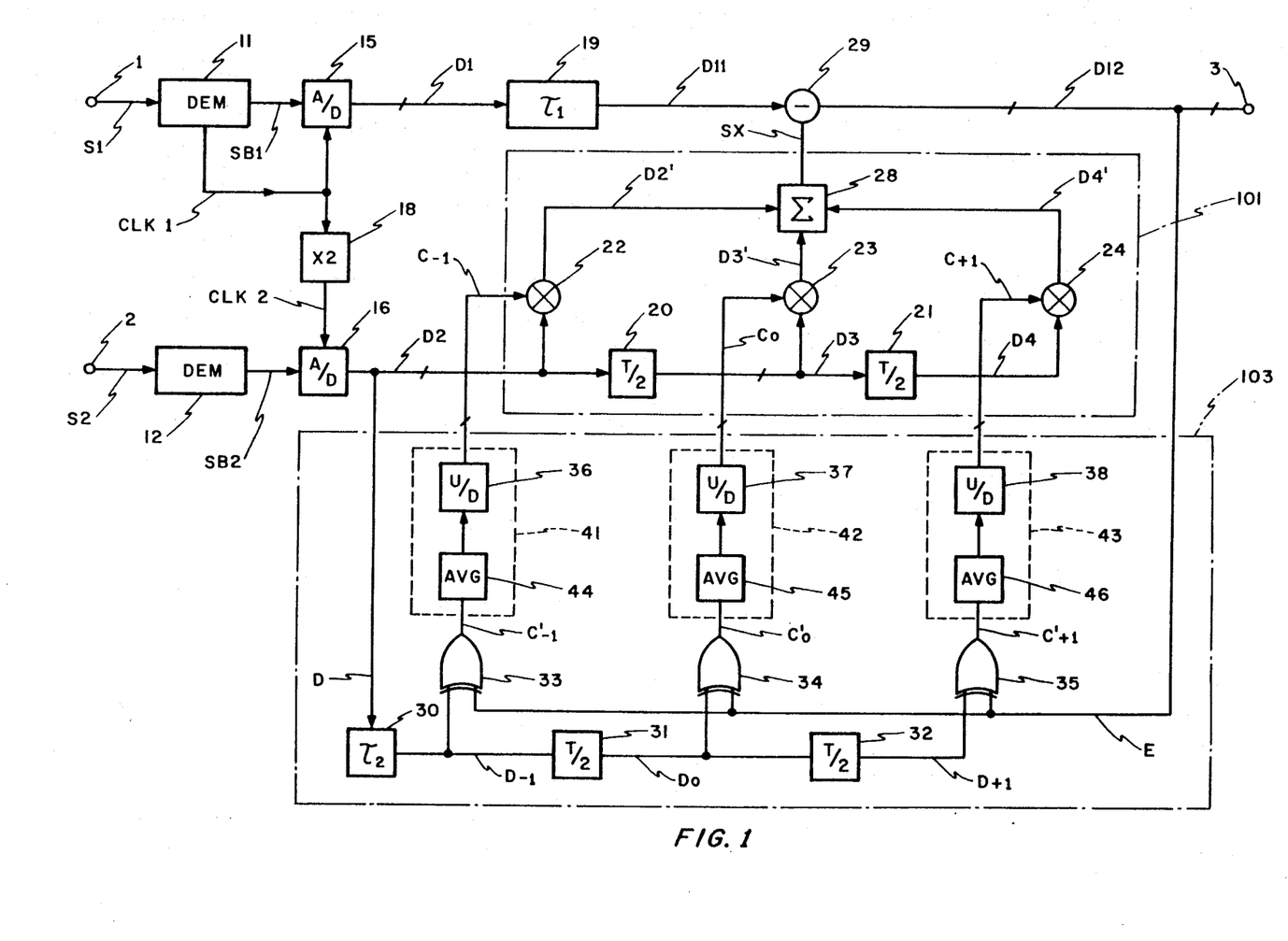
FIG. 1 is a block diagram of one embodiment of a cross-polarization interference canceller according to the present invention.

FIG. 1 is a block diagram showing the first embodiment of a cross-polarization interference canceller according to the present invention, in which the common components to those illustrated in FIG. 6 will be represented by the same reference numerals. The shown first embodiment is directed to an embodiment, in which T/2 interval type three tap transversal filter including taps having intervals of one half of a reproduction clock period T.

In FIG. 1, a modulation wave S1 of an intermediate frequency band of a primary polarized wave (H polarized wave or V polarized wave) side, which is interfered, is input to a terminal 1. A modulation wave S2 of an intermediate frequency band of a different polarized wave (V polarized wave or H polarized wave) side, which provides the interference, is input. The primary polarized wave signal S1 and the different polarized wave signal S2 are respectively input to demodulator 11 and 12. The demodulator 11 and 12 are responsive to those input signals to output base band signals SB1 and SB2 to respective of analog-to-digital converters 15 and 16.

The demodulator 11 reproduces a clock signal CLK1. The clock signal CLK1 is input to the analog-to-digital converter 15. At the same time, the clock signal CLK1 is input to a doubler circuit 18. The doubler circuit 18 doubles the input clock signal CLK1 to output a doubled clock signal CLK2 to the analog-to-digital converter 16. The analog-to-digital converter 15 samples and quantizes the primary polarized wave side base band signal SB1 with the clock signal CLK2 to output to a delay circuit 19 as a digital signal sequence D1. Also, the analog-to-digital converter 16 samples and quantizes the different polarized wave side base band signal SB2 with the clock signal CLK2 to output to a transversal filter 101 as a digital signal sequence D2.

The transversal filter 101 outputs a compensation signal SX derived by controlling amplitude and phase of the signal from the analog-to-digital converter 16. The compensation signal SX is input to a subtracter 29. The subtracter 29 also receives the output D11 of a delay circuit 19. The subtracter 29 subtracts the output signal of the transversal filter 101 from the output D11 of the delay circuit 19 so as to remove an interference component superimposed on the primary polarized wave signal. The primary polarized wave signal D12, from which the interference component is removed, is output to a terminal 3.

On the other hand, among the primary polarized wave signal D12, an error signal E (residual error component after interference compensation) representative of an deviation of the received signal from a reference value, is supplied to a transversal filter control circuit 103. The transversal filter control circuit 103 correlates the most significant bit D (data polarity signal) of the output D2 of the analog-to-digital converter 16 and the error signal E, and controls a weighting coefficient of each tap of the transversal filter 101 so as to minimize the error signal component. The transversal filter 101 comprises shift registers 20 and 21 connected in series and adapted to delay the output D2 of the analog-to-digital converter 16 for T/2, respectively, a multiplier 22, to which the output D2 of the analog-to-digital converter 16 is input, a multiplier 23 connected to the shift register 20 as the delay element, a multiplier 24 connected to the shift register 21, and an adder 28 adding the outputs of the multipliers 22-24. Tap control signals $C-1$, $C0$ and $C+1$ from the transversal filter control circuit 103 are supplied to the multiplier 22, 23 and 24, respectively.

Then, as set forth above, the tap coefficients are controlled so that the error component of the error signal E can be minimized. At this time, at the output side of the adder, a compensation signal SX which is a signal a substantially equal to the cross-polarization interference component superimposed to the primary polarization interference The operation of the cross-polarization interference canceller is similar to that illustrated with reference to FIG. 6, except for the transversal filter control circuit 103.

Next, detailed description for the transversal filter control circuit 103 as the particular element to the present invention. The error signal E represents an offset amount of the received multi-level base band signal from a reference value. In case of $2^N$ valued base band signal, when this signal is analog-to-digital converted, the $(N+1)$th bit from the most significant bit becomes the error signal E which represents the polarity of the error. Normally, as the error signal, the $(N+1)$th bit of the signal D12 after compensation of the interference is used to represent a polarity of a residual error component after compensation. On the other hand, as a data polarity signal D, the first bit of the input signal D2 of the transversal filter 101 is used in case of the MZF method. The data polarity signal D is input to a delay circuit 30 for compensation of delay in a multiplier 23 and an adder 28 in the transversal filter 101. After adjustment of the timing relative to the error signal E, the data polarity signal D is input to flip-flops 31 and 32 which are connected in series.

With regard to a tap coefficient CO of the multiplier 23 in case of a center tap of the transversal filter, at first, the binary signal CO′ is derived as a product of binary values of the error signal E and a signal DO which is the T/2 sec delayed output $D-1$ delayed by the delay circuit. Namely, the binary signal CO′ is derived by an exclusive OR (EX-OR) circuit 34 to be input to a moving average circuit 42.

The tap coefficient CO(L) as an output of the running average circuit 42 at a time $t=L$ can be expressed by:

$$CO(L) = \left(\frac{1}{2^K}\right) \sum_{t=L-J+1}^{L} E(t) \times DO(t) \quad (L \geq J) \tag{3}$$

Namely, CO(L) is derived as a moving average of the correlation result $E(t) \cdot DO(t)$ over J bits. In short, conversely to the prior art, in which the tap coefficient is derived as the average using the ground total of the correlation results over all L bits from time $t=1$ to $T=L$, as expressed in the foregoing equation (1), the running average circuit according to the present invention derives the tap coefficient with always using the most recent J bits of correlation results. By employing such moving average, since the tap coefficient value will not depend on the older value than $L-J$ bit, the offset of random characteristics of the signal, such offset will never be accumulated in the extent that the tap coefficient becomes an abnormal value.

For example, when $J=10^3$ is selected and assuming that the number of stage of the up/down counter $K=20$, the current time $L=10^6$, and the correlation result becomes "1":"$-1$"$=51:49$ despite of absence of the cross-polarization interference, due to offset of random characteristics of the signs of the correlation result, the tap coefficient C0 can be expeessed by:

$$C0 = \left(\frac{1}{2^{20}}\right) \times \frac{2}{100} \times 10^3 = 0.000019 \tag{4}$$

As can be appreciated, the tap coefficient obtained through the foregoing equation (4) is smaller in three digit than that obtained through the equation (2). Therefore, the tap coefficient C0 can approach true zero. The operation for obtaining the moving average of the tap coefficient is equally applicable for deriving other tap coefficients C−1 and C+1.

Moving average circuits 41, 42 and 43 may comprise moving average preliminary process circuits 44, 45 and 46 and up/down counters 36, 37 and 38 respectively connected to the corresponding running average preliminary process circuits.

Here, assuming E(t)·D0(t)=R(t) in the foregoing equation (3), the value S(L) of the up/down counter at a time t=L can be expressed by the following equation:

$$S(L) = \sum_{t=L-J+1}^{L} R(t) \quad (5)$$

Then, the value S(L+1) of the up/down counter at a time t=L+1 can be expressed by:

$$S(L+1) = \quad (6)$$

$$\sum_{t=L-J+2}^{L+1} R(t) = \sum_{t=L-J+1}^{L} R(t) - R(L-J+1) +$$

$$R(L+1) = S(L) - R(L+1-J) + R(L+1)$$

$$= S(L) - F2 + F1 \quad (7)$$

It should be noted that, in the foregoing equation, F1 is a replacement of a correlation output R(L+1) at t=L+1 and F2 is a replacement of a correlation output R(L+J−1) at J bit ahead from F1.

From the foregoing equation (7), the value of the up/down counter at the time t=L+1 becomes the value derived by subtracting the value F2 and add the value F1 for the value of the up/down counter at the time t=L. This process is done by the moving average preliminary process circuit 44~46 which will be discussed herebelow.

Figure 2:
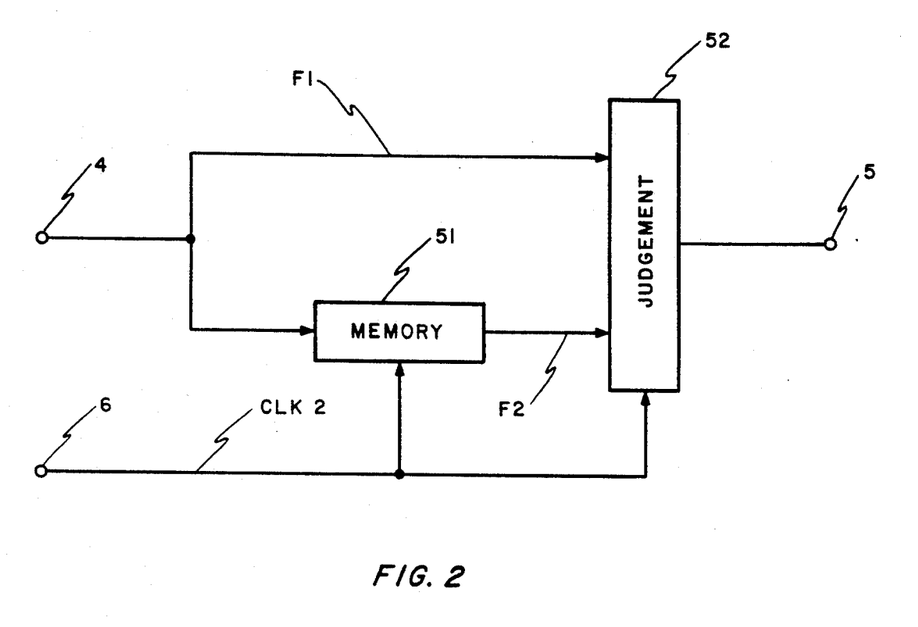
FIG. 2 is a block diagram of a moving average preliminary process circuit in the cross-polarization interference canceller of FIG. 1.
Figure 3:
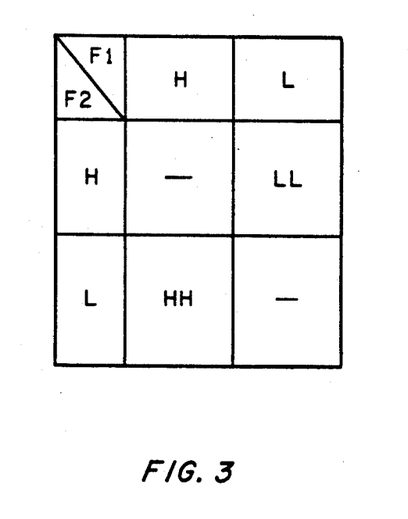
FIG. 3 is an illustration showing relationship between input and output in the running average preliminary process circuit of FIG. 2.

The construction of the moving average preliminary process circuit 44~46 is illustrated in FIG. 2. The correlation output F1 from the EX-OR is input to a judgement circuit 52 and to a memory circuit 51 through a terminal 4. From the memory circuit 51, the correlation output F2 of J bit ahead is input to the judgement circuit 52. In the judgement circuit 52, two inputs F1 and F2 are compared, F2 is subtracted from the ground total up to the present of the up/down counter and F1 is newly added. Namely, if F1=F2, the clock pulse is not output to the up/down counter. Therefore, the up/down counter will not perform either up counting or down counting so that the tap coefficient can be held unchanged. On the other hand, when F1="H" and F2="L", since the sum up to the present is subtracted by F2 and added by F1, it requires counting up for two bits. Therefore, two "H" clock pulses are output to the up/down counter. When F1="L" and F2="H", it similarly requires counting down for two bits. Therefore, two "L" clock pulses are output to the up/down counter. This manner is illustrated in FIG. 3.

Figure 4A:
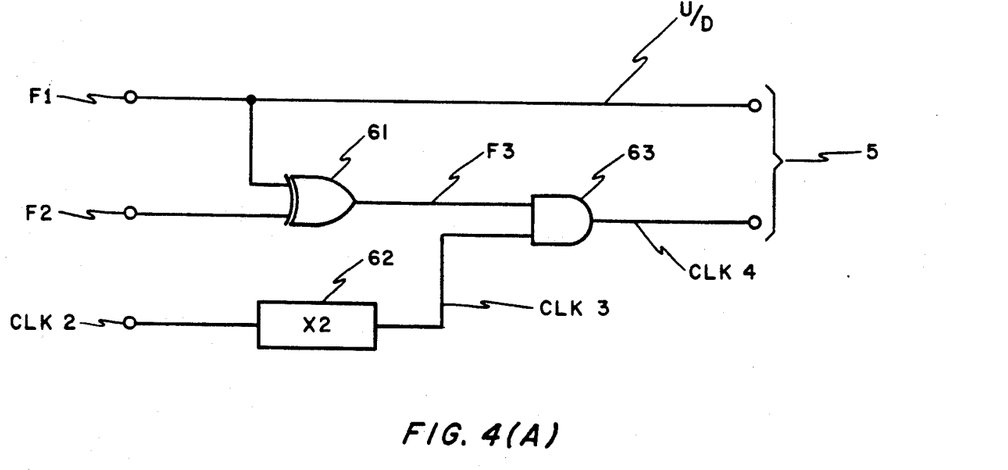
FIG. 4A is a circuit diagram showing a concrete example of a judgement circuit of FIG. 2.

The memory circuit 51 can be easily realized by a shift register, RAM or so forth. The judgement circuit 52 can also be realized by a normal logic circuit element. FIG. 4(A) shows one concrete example of the judgement circuit 52. Two signals F1 and F2 are input to EX-OR circuit 61. The output F3 of the EX-OR circuit becomes one input of an AND circuit 63. The output F3 becomes "H" only when {F1="H", F2="L"} or {F1="L", F2="H"}. Namely, only when counting up or counting down operation is required, the output F3 becomes "H" and otherwise held "L".

On the other hand, the clock signal CLK2 is doubled in the frequency by a doubler 62 and input to another input of the AND circuit 63 as a clock signal CLK3. The output CLK4 of the AND circuit 63 serves as the clock pulse for the up/down counter. A signal U/D derived by directly introducing the signal F1 serves as an up/down count command signal so that the clock pulses CLK4 and the signal U/D (=F1) are expressed as output 5 of the moving average preliminary process circuit 52.

Figure 4B:
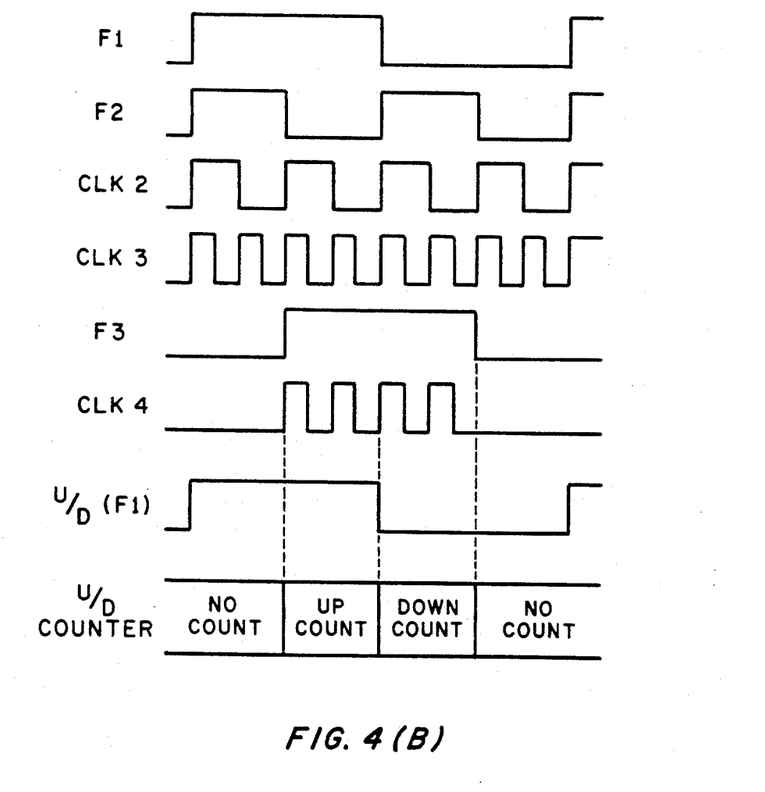
FIG. 4B is a timing chart showing operation of the judgement circuit of FIG. 4A.

FIG. 4(B) is a timing chart showing waveforms of each portion of the judgement circuit of FIG. 4(A). When the signals F1 and F2 have the waveforms as illustrated in FIG. 4B, two bite up counting pulse or two bits down counting pulse is output as the output 5 of the judgement circuit 52 when {F1="H", F2="L"} or {F1="L", F2="H"}.

Also though the foregoing discussion has been given for the cross-polarization interference canceller having three taps with T/2 of tap interval, it is possible to obtain satisfactorily high accuracy even when the random characteristics of the sign has certain offset, by employing the moving average circuit set forth above in the transversal filter control circuit 103 for the cross-polarization interference canceller having a tap number R with tap interval of T/M (M and R are natural values).

Figure 5:
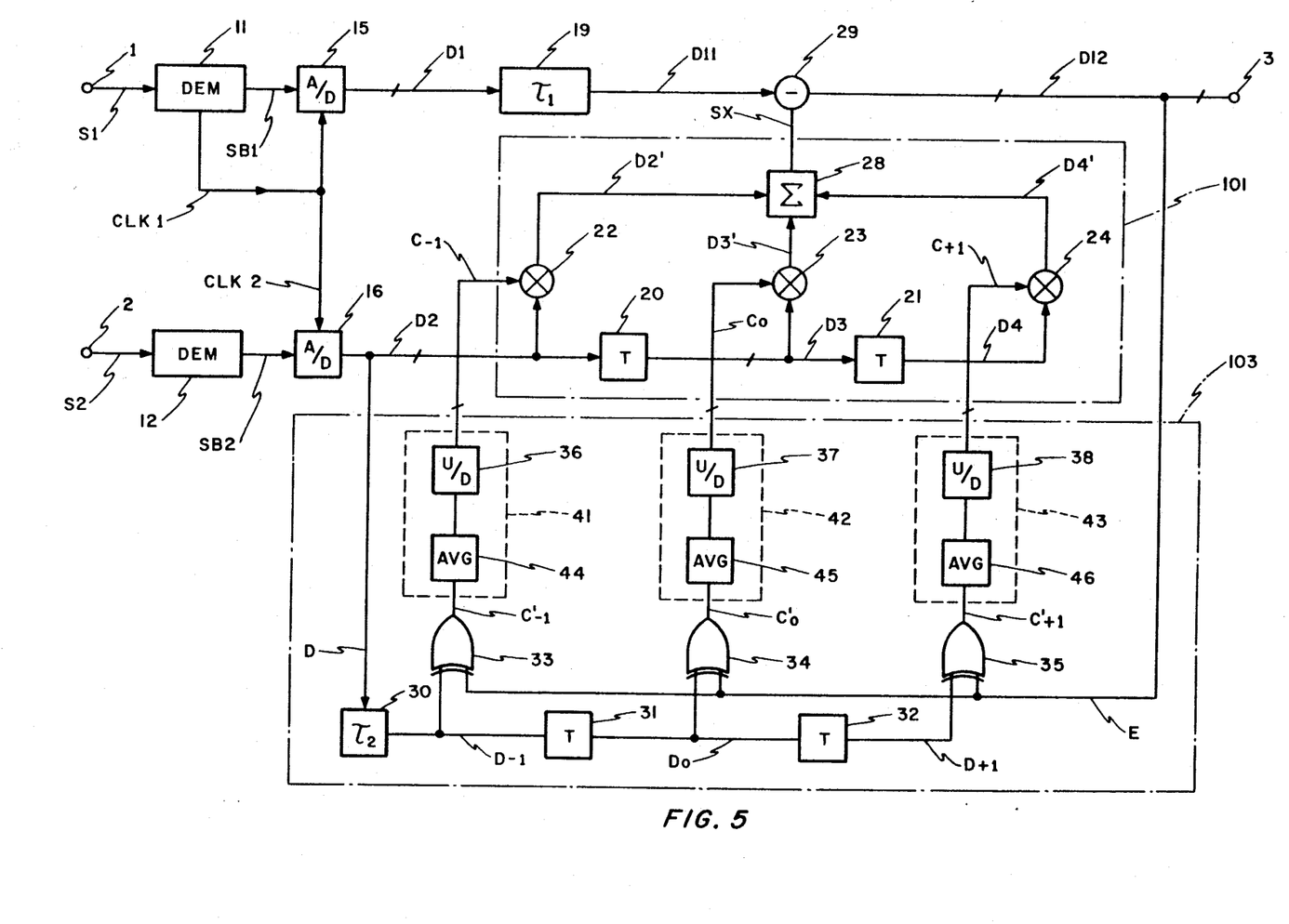
FIG. 5 is a block diagram of another embodiment of a cross-polarization interference canceller according to the present invention.

FIG. 5 shows another embodiment of the cross-polarization interference canceller of the present invention, in which M=1 and R=3. The shown construction is substantially similar to those of the foregoing first embodiment except for neglecting of the doubler 18 and shorting the circuit, and setting of the delay amount of the shift registers 20, 21, 31 and 32 to T. Therefore, detailed discussed is neglected.

As set forth above, according to the present invention, in the transversal filter control circuit of the cross-polarization interference canceller, since the moving average circuit is used for averaging the correlation results and outputting the tap coefficient, the tap coefficient can be sufficiently close to a true value even when the random characteristics of the sign has certain magnitude of offset. Therefore, since the tap coefficient becomes sufficiently close to zero when the cross-polarization interference is not present so that interference noise in the canceller can be successfully avoided.

What is claimed is:

1. A cross-polarization interference canceller comprising:
   a first demodulator for demodulating a primary polarized wave signal among two orthogonally polarized signal;
   a second demodulator for demodulating a different polarized wave signal;
   a first analog-to-digital converter for sampling and quantizing an output base band signal of said first demodulator with a reproduction clock generated by said first demodulator;
   a second analog-to-digital converter for sampling and quantizing an output base band of said second demodulator with said reproduction clock;
   a T/M interval all digital type transversal filter operating at a clock period of 1/M (M is natural value)

of a period T of said reproduction clock with respect to an output digital signal sequence of said second analog-to-digital converter;

a transversal filter control means for supplying tap coefficient for said transversal filter;

a delay means connected to the output of said first analog-to-digital converter for providing a delay corresponding to a time delay by said transversal filter;

a digital subtracter outputting a compensated primary polarized wave signal by subtracting an output digital signal sequence from said transversal filter from an output signal sequence of said delay means for canceling cross-polarization interference from said different polarized wave side contained in said primary polarized wave signal;

said transversal filter control means including a moving averaging means for generating said tap coefficient with a running average averaged always using a sum S of correlation outputs over a most recent predetermined J bits (with taking correlation output at t=1 is the first bit and current correlation output at a current time t=L is the Lth bit, J is a integer less than or equal to L) among said correlation outputs for outputting said tap coefficient by averaging outputs of correlation between a residual error component contained in compensated primary polarized wave signal and a data polarity signal of the output digital signal sequence of said second analog-to-digital converter.

2. A cross-polarization interference canceller as set forth in claim 1, wherein said moving averaging means includes an arithmetic means subtracting the correlation output at J bit ahead from the immediately preceding sum S of said correlation outputs and adding the current correlation output thereto.

3. A cross-polarization interference canceller as set forth in claim 2, wherein said moving averaging means includes means for calculating an exclusive OR of said residual error component and said data polarity signal, and said arithmetic means includes a memory means for temporarily storing the result of said exclusive OR operation to output as the correlation output at J bit ahead, means for comparing the output of said memory means and the result of current exclusive OR operation for generating an up/down counting pulse depending upon the result of comparison and an up/down counter varying a content of count depending upon said up/down counting pulse.

4. A cross-polarization interference canceller as set forth in any one of claims 1 to 3, wherein said transversal filter comprises a T/2 interval full digital type transversal filter, and said second analog-to-digital converter is constructed to operate at a clock period one half of the period T of said reproduction clock signal.

5. A cross-polarization interference canceller comprising:

a first demodulator for demodulating a primary polarized wave signal among two orthogonally polarized signals;

a second demodulator for demodulating a different polarized wave signal;

a first analog-to-digital converter for sampling and quantizing an output base band signal of said first demodulator with a reproduction clock generated by said first demodulator;

a second analog-to-digital converter for sampling and quantizing an output base band of said second demodulator with said reproduction clock;

a T/M interval all digital type transversal filter operating at a clock period of 1/M (M is natural value) of a period T of said reproduction clock with respect to an output digital signal sequence of said second analog-to-digital converter;

a transversal filter control means for supplying tap coefficient for said transversal filter;

a delay means connected to the output of said first analog-to-digital converter for providing a delay corresponding to a time delay by said transversal filter;

a digital substractor outputting a compensated primary polarized wave signal by subtracting an output digital signal sequence from said transversal filter from an ouput signal sequence of said delay means for canceling cross-polarization interference from said different polarized wave side contained in said primary polarized wave signal;

said transversal filter control means including a running averaging means for generating said tap coefficient with a running average based on a most recent limited number of correlation results of correlation residual error components contained in compensated primary polarized wave signal and data polarity signal of the output digital signal sequences of said second analog-to-digital converter.

6. A cross-polarization interference canceller comprising:

a first demodulator for demodulating a primary polarized wave signal among two orthogonally polarized signals;

a second demodulator for demodulating a different polarized wave signal;

a first analog-to-digital converter for sampling and quantizing an output base band signal of said first demodulator with a reproduction clock generated by said first demodulator;

a second analog-to-digital converter for sampling and quantizing an output base band of said second demodulator with said reproduction clock;

a T/M interval all digital type transversal filter operating at a clock period of 1/M (M is natural value) of a period T of said reproduction clock with respect to an output digital signal sequence of said second analog-to-digital converter;

a transversal filter control means for supplying tap coefficient for said transversal filter;

a delay means connected to the output of said first analog-to-digital converter for providing a delay corresponding to a time delay by said transversal filter;

a digital subtracter outputting a compensated primary polarized wave signal by subtracting an output digital signal sequence from said transversal filter from an output signal sequence of said delay means for canceling cross-polarization interference from said different polarized wave side contained in said primary polarized wave signal;

said transversal filter control means including a running averaging means for generating said tap coefficient with a running average based on sum of correlation results of correlation residual error components contained in compensated primary polarized wave signal and data polarity signal of the output digital signal sequences of said second analog-to-digital converter, sampled over a most recent limited period.

* * * * *